(12) United States Patent
Rybakov et al.

(10) Patent No.: US 8,965,117 B1
(45) Date of Patent: Feb. 24, 2015

(54) IMAGE PRE-PROCESSING FOR REDUCING CONSUMPTION OF RESOURCES

(71) Applicant: Amazon Technologies, Inc., Reno, NV (US)

(72) Inventors: Oleg Rybakov, Seattle, WA (US); Christopher John Lish, Seattle, WA (US); Chang Yuan, Seattle, WA (US); Junxiong Jia, Mercer Island, WA (US); Rakesh Madhavan Nambiar, Seattle, WA (US); Matias Omar Gregorio Benitez, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/109,204

(22) Filed: Dec. 17, 2013

(51) Int. Cl.
*G06K 9/00* (2006.01)
*G06K 9/18* (2006.01)
*G06K 9/46* (2006.01)
*G06K 9/62* (2006.01)
*G06T 5/00* (2006.01)

(52) U.S. Cl.
CPC *G06K 9/18* (2013.01); *G06K 9/183* (2013.01); *G06K 9/4604* (2013.01); *G06K 9/6267* (2013.01); *G06T 5/002* (2013.01)
USPC ........... 382/165; 382/162; 382/190; 382/197; 382/170; 382/305

(58) Field of Classification Search
CPC ..................... G06K 9/00456; G06F 17/30876; H04N 1/00204
USPC ......... 382/162, 164, 165, 190, 197, 173, 170, 382/195, 175, 305; 348/453; 235/470, 454
See application file for complete search history.

(56) References Cited

U.S. PATENT DOCUMENTS

| | | | |
|---|---|---|---|
| 7,575,171 B2 * | 8/2009 | Lev | 235/470 |
| 8,422,783 B2 * | 4/2013 | Yuan et al. | 382/173 |
| 8,649,600 B2 * | 2/2014 | Saund | 382/175 |
| 2006/0120627 A1 * | 6/2006 | Shiiyama | 382/305 |

OTHER PUBLICATIONS

Otsu, Nobuyuki, "A threshold selection method from gray-level histograms". IEEE Trans. Sys., Man., Cyber. 9 (1), 1979, pp. 62-66.

* cited by examiner

*Primary Examiner* — Ali Bayat
(74) *Attorney, Agent, or Firm* — Novak Druce Connolly Bove + Quigg LLP (57) ABSTRACT

Embodiments of the subject technology provide methods and systems of image pre-processing for improving the accuracy of optical character recognition (OCR) and reducing the power consumption on a given computing device (e.g., mobile computing device). The subject technology, in some examples, classifies an image received from a camera of a mobile computing device into one or more classes: 1) normal background, 2) textured background, 3) image with text, 4) image with barcode, 5) image with QR code, and/or 6) image with clutter or "garbage." Based on the classes associated with the image, the subject technology may forgo certain image processing operations, when the image is not associated with a particular class, in order to save resources (e.g., CPU cycles, battery power, memory usage, etc.) on the mobile computing device.

20 Claims, 6 Drawing Sheets

IMAGE PRE-PROCESSING FOR REDUCING CONSUMPTION OF RESOURCES

BACKGROUND

Optical character recognition (OCR) may be utilized to convert image data (e.g., scanned images, photos, etc.) to machine-encoded data. For instance, by applying OCR, a scanned or camera-captured image may be converted into a machine-editable format that can be processed for storing, searching, editing or other purposes.

In order to accurately recognize text with a given OCR implementation, an image typically needs to be of a high quality. The quality of the image may depend on different factors such as the quality of the lens, light intensity variation, relative motion between the camera and text, focus, etc. In this regard, an OCR implementation may detect a majority of text characters in good quality images, such as images having uniform intensity, no relative motion, and good focus. However, even with good quality images, some OCR implementations are unable to accurately detect all text characters. Additional challenges may be present when an OCR implementation attempts to recognize text from lesser quality images, such as images containing variations in lighting, shadows, contrast, glare, blur, etc.

With the introduction of more powerful and capable mobile computing devices (e.g., smartphones, phablets, tablet computing devices, etc.), applications that were traditionally found on desktop computing devices or servers are being implemented for running on mobile computing devices. For a given OCR implementation adapted for use on a mobile computing device, a set of challenges are presented as mobile computing devices are used in different physical environments and have a more limited set of resources that may require a more efficient OCR implementation to optimally run on a given mobile computing device.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the subject technology may overcome one or more deficiencies experienced in existing approaches to analyzing an image to determine content associated with that image, such as by providing optical character recognition (OCR).

A given mobile computing device includes a set of finite resources (e.g., processor, memory, battery, etc.) and different components providing respective functionality (e.g., touchscreen display, wireless radio(s), battery power source, etc.). In some examples, a mobile computing device may include a camera component that provides image and/or video capturing functionality for the mobile computing device. In this regard, OCR performed by the mobile computing device may use such image and/or video capturing functionality provided by a given camera component(s). Although a mobile computing device (e.g., a smart phone, an electronic book reader, or tablet computer) is mentioned, it should be understood that various other types of electronic devices that are capable of determining and processing input can be used in accordance with various embodiments discussed herein. These devices can include (but are not limited to), for example, notebook computers, personal data assistants, video gaming consoles or controllers, portable media players, and wearable computers (e.g., smart watches, smart glasses, etc.) among others.

An OCR engine implemented as software and/or hardware (e.g., firmware, application-specific integrated circuit, etc.) may be provided in some embodiments of the subject technology. Running an OCR engine on a mobile device, however, may be resource-intensive if the OCR engine is capturing images in a video mode (e.g., in rapid succession). In these cases, the OCR engine will consume additional CPU time/power and, as a result, degrade a user experience by reducing battery power of the mobile device.

Additionally, OCR accuracy on mobile devices may depend on various factors: image quality (e.g., contrast, sharpness/focus, exposure, noise level, etc.), font type, character size and/or a background on which characters are recognized. A mobile computing device may be used in varying environments or conditions (e.g., dark lighting, uneven lighting, etc.), which may not be ideal for performing OCR in light of the aforementioned factors that impact OCR accuracy.

In view of the above, the subject technology provides methods and systems of image pre-processing for improving the efficiency of optical character recognition (OCR) and other object recognition (e.g., bar code and QR code recognition). The subject technology, in some examples, provides two types of classifiers that classify an image received from a camera of a mobile computing device into one or more classes. For instance, a first type of image classifier determines whether the image has a normal background or a textured background. A second type of image classifier determines whether the image includes text, barcode pattern(s), and/or QR code pattern(s). Based on the classes associated with the image, the subject technology may forgo certain image processing operations, when the image is not associated with a particular class, in order to save resources (e.g., CPU cycles, battery power, memory usage, etc.) on the mobile computing device.

Figure 1:
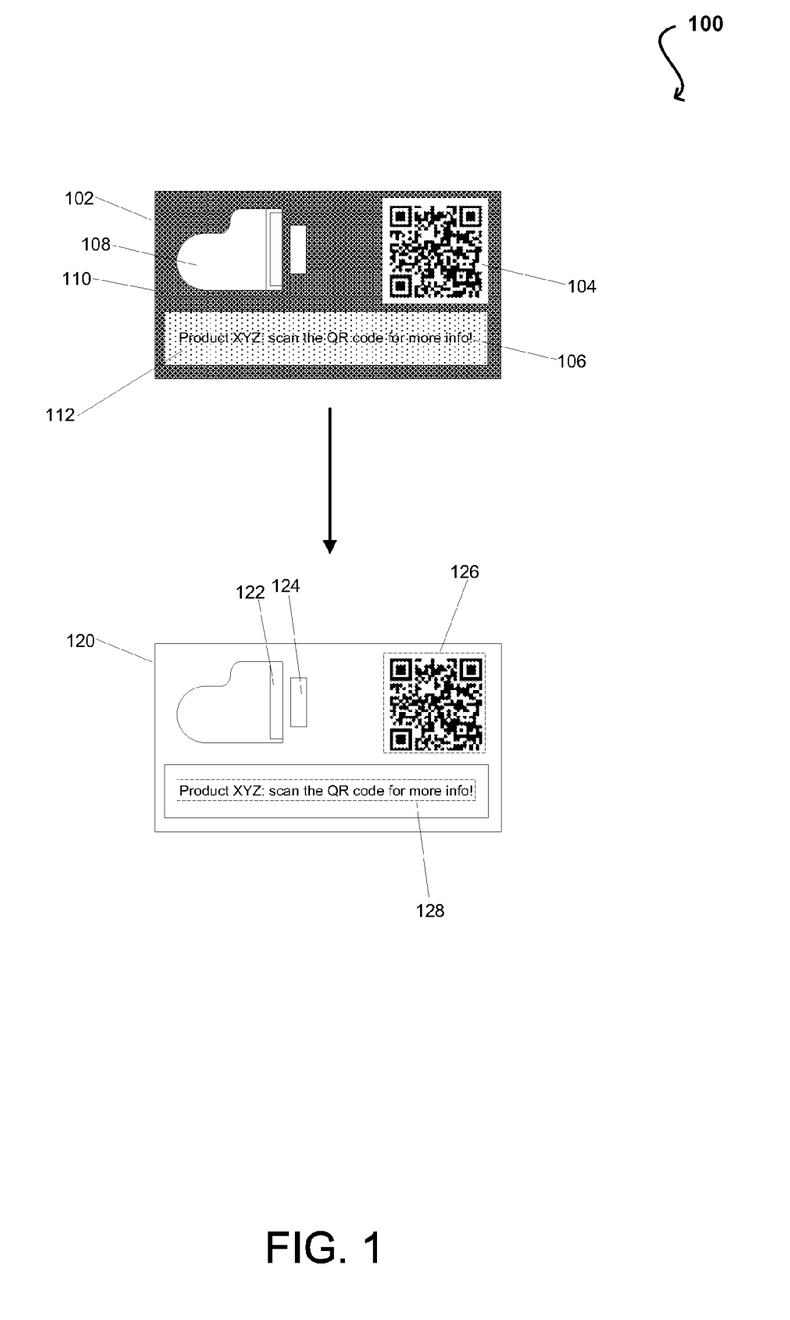
FIG. 1 conceptually illustrates an example in different stages for performing pre-processing on an image in accordance with some embodiments of the subject technology.

FIG. 1 conceptually illustrates an example 100 in different stages for performing pre-processing on an image in accordance with some embodiments of the subject technology. More specifically, FIG. 1 illustrates an example of performing various smoothing and texture detection steps in order to identify objects included in an image.

As illustrated in a first stage of FIG. 1, an image 102 (e.g., an input image) is received by an image pre-processing component of a mobile computing device. The image 102, in some examples, may have been captured/acquired from a camera of the mobile computing device. The image 102 includes a QR code pattern 104, a text pattern 106, and a graphic 108. Further, the image 102 includes a texture 110 and a texture 112.

In some embodiments, the image pre-processing component of the mobile computing device may then determine whether the image 102 is a textured image. Any type of texture detection or analysis may be used. For example, texture detection may be based on an intersection analysis as described in further detail below or using a wavelet or Fourier analysis. In the example of FIG. 1, the texture detection would result in determining that the image 102 is textured.

Responsive to determining that the image 102 is textured, the image pre-processing component may then perform a smoothing operation (e.g., Gaussian blur, Gaussian filtering, median filtering, or other technique) to remove or reduce the texture in the image 102.

After smoothing, the image may be binarized. In the example of FIG. 1, the image 120 has undergone binarization to convert the image 120 to a black and white image. Subsequent processing of the binarized image may be more efficient than processing the image without binarization since it reduces the amount of colors in the binarized image to either black or white, and may make objects or patterns included in the image more prominent. As used herein, the term "binarization" refers to a set of operations in which an image (or portion of the image) is processed to only have two possible values that respectively represent one of two colors for each pixel. For instance, two colors utilized for a binarized image may be black and white. However, it is appreciated that any two colors may be used and still be within the scope of the subject technology. In one example, pixels corresponding to text, barcode and/or QR code patterns may be one color while the remaining portion of the image (e.g., background) is another color. Binarization techniques may include, but are not limited to, image segmentation, maximally stable extremal regions (MSER), maximally stable color regions (MSCR) or intersection analysis (as described below).

After binarization, the image pre-processing component may recognize objects in the image, such as shapes 122 and 124, an object 126 corresponding to a QR code pattern, and an object 128 corresponding to a text pattern. For example, the pre-processing component may recognize the objects in the image by first identifying external contours of glyphs in the image. As used herein, a glyph may include any portion of an object to be recognized, including a letter, a part of a letter, a part of a bar code, and a part of a QR code. For each glyph, a number of features can be determined, and the features may be derived from the contour of the glyph, the binarized image, the original image, or the smoothed image. These features may be used to make an initial determination of the type of object. For example, a glyph in the shape of a vertical line may have a high likelihood of being part of a bar code and a letter (e.g., the letter "i" or "l"), and a small circle may have a high likelihood of being part of a letter (e.g., the dot of an "i") or part of a QR code. The initial classification of each glyph may be done using any relevant techniques, such as machine learning.

After an initial determination of each glyph, the glyphs may be clustered together. The glyphs may be clustered based on their proximity to one another and features corresponding to the glyphs. For example, a sequence of glyphs that are adjacent to one another, all have a high likelihood of corresponding to letters, and are of a similar color may be clustered into a single object. Any relevant procedures for clustering the glyphs may be used, such as an unsupervised clustering algorithm. After the glyphs have been clustered into objects, a final determination is made of the type of each object. For example, object 126 may be determined to most likely correspond to a QR code and object 128 may be determined to most likely correspond to a text object.

The image pre-processing component then prioritizes the objects for further processing. It may be desirable to return recognition results as quickly as possible to a user, and by prioritizing the objects, the most relevant results may be delivered more quickly to the user. For example, if the image includes a large bar code in the middle of the image and smaller text along an edge of the image, it may be determined that the bar code object is more important than the text object, and the bar code image may be recognized first and information about a product associated with the bar code may be presented to a user. After processing the bar code object, the text object may be processed to recognize the text which may then be presented to the user. The priorities of the objects may be determined using any relevant techniques. For example, the size of the object, the position of the object, and/or a likelihood that the object has been classified correctly (e.g., the object has been classified as a bar code but with low likelihood) are examples of factors that determine the respective priorities of the objects for processing.

In the example of FIG. 1, the object 128 may be provided to a text recognizer and the object 126 provided to a QR code recognizer for processing. The image pre-processing component may determine that the image 120 did not include any objects with a barcode pattern and no portion of image 120 would be passed to a bar code recognizer. By determining the portions of the image likely to contain useful information and sending those portions to the relevant type of recognizer (e.g., a text object to a text recognizer), resources of the mobile computing device are preserved. The recognizers may be implemented locally by the mobile computing device or may be implemented on a server (e.g., remotely) that is available to the mobile computing device.

Figure 2:
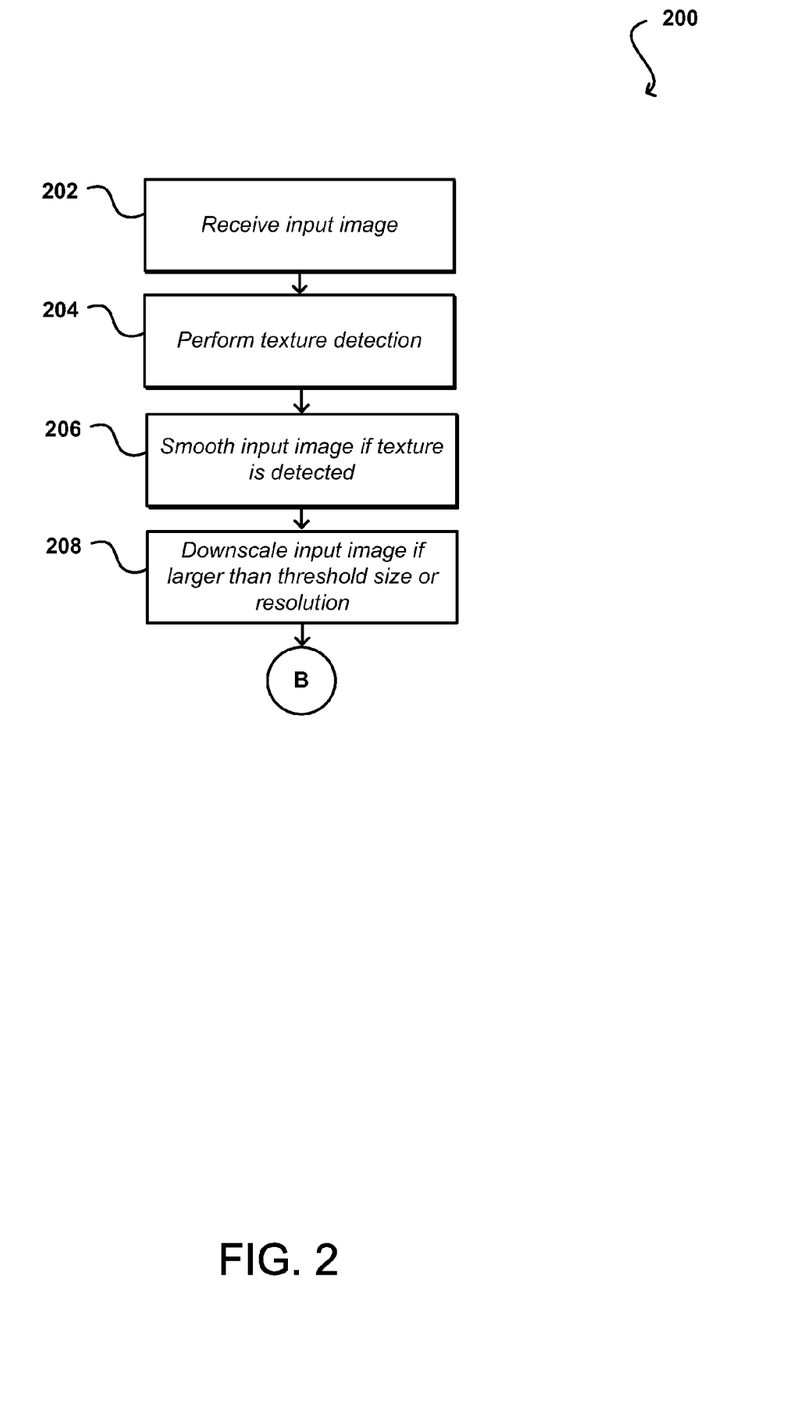
FIG. 2 illustrates steps of an example process for performing a set of pre-processing operations for a given image in accordance with some embodiments of the subject technology.

FIG. 2 illustrates steps of an example process 200 for performing a set of pre-processing operations for a given image in accordance with some embodiments of the subject technology. In some embodiments, the process 200 may be implemented by one or more computing devices or systems. More specifically, FIG. 2 provides an example process that may be utilized to detect texture in an input image and smooth the image, if needed, to reduce or remove the texture.

At step 202, an image is received. The received image may be captured by a camera in a mobile device and provided as an input image for further processing in some embodiments. In some embodiments, the input image may be downscaled before further processing (e.g., when full resolution is not needed) to speed up processing times. The image may be processed on the mobile device, on a server, or on a combination of the two.

At step 204, texture detection may be performed. Texture detection may be performed using any relevant techniques, such as a wavelet analysis, a Fourier analysis, or intersection analysis (described in more detail below). The presence of texture (e.g., in the form of grain noise) in an image may make object recognition tasks more difficult. For example, the presence of texture may interfere with the detection of contours as contours created by the texture may be difficult to distinguish from the texture of objects in the image. To improve object recognition, the image may be smoothed to remove the texture.

At step 206, if texture was detected, a smoothing operation is performed on the input image. The amount of smoothing performed on the input image may depend on the amount of texture detected in the input image. For example, an image with a large amount of texture may have more smoothing performed on the image and an image with a small amount texture may have less smoothing performed on the image. In some examples, the smoothing operation may be performed utilizing a technique such as a Gaussian blur, median filtering, lowpass filtering, convolution, or another smoothing algorithm, etc. If texture was not detected in the input image, then the smoothing operation can be skipped and the process 200 may continue at step 208.

Figure 4:
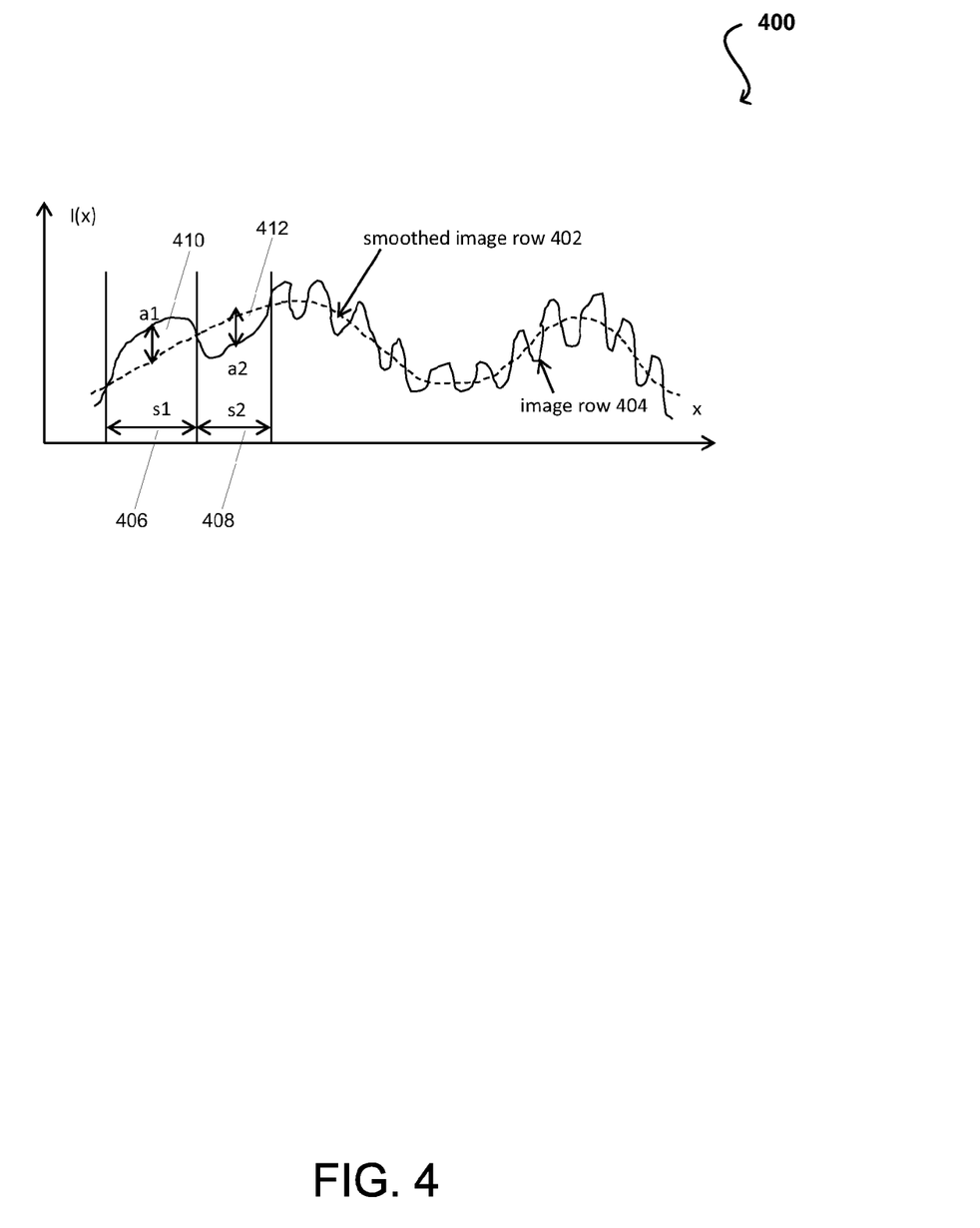
FIG. 4 illustrates an example of a respective intersection analysis performed on an image that can be used in accordance with some embodiments of the subject technology.

In some embodiments, the texture detection may be implemented using an intersection analysis. To perform such an intersection analysis, the image is initially downscaled. The downscaling may be performed in one dimension or in two dimensions, and may use any known downscaling techniques. For example, downscaling may be performed by simply removing every other pixel or by using a smoothing function (e.g., linear, nearest-neighbor, bilinear, or bi-cubic smoothing) to prevent anti-aliasing. The downscaled image is then upscaled, and any known techniques may be used to upscale the image. For example, interpolation may be utilized to upscale the image in some embodiments (e.g., linear, nearest-neighbor, bilinear, or bi-cubic, interpolation). After downscaling and upscaling, the image may have the same size, but may be smoothed in that higher frequency information may be removed from the image. FIG. 4 shows an example of an image row 404 and the smoothed image row 402 after it has been downscaled and upscaled.

After the image has been downscaled and upscaled, an intersection analysis may performed for each row or column of the image. For illustration, the intersection analysis will be described for a row of the image. For the row of the image, as illustrated in FIG. 4, intersections may be determined between the image row 404 and the smoothed image row 403. From the intersections, a length and an amplitude may be determined. For example, FIG. 4 shows a length s1 between a first intersection and a second intersection and a length s2 between the second intersection and a third intersection. In addition, FIG. 4 shows an amplitude a1 between the first and second intersections and an amplitude a2 between the second and third intersections. The amplitude may correspond to the maximum difference between the image row 404 and the smoothed image row 402 between the corresponding intersections. In one example, the intersection analysis may determine a distribution of intersection lengths and a distribution of amplitudes of intersections for one or more rows and/or one or more columns. The distribution of intersections lengths and amplitudes may be used to determine the presence and/or amount of texture in the image. For example, when most of the amplitudes are small, it may be determined than no or slight texture is present, and when most of the amplitudes are large, it may be determined that a large amount of texture is present. In some embodiments, the presence of texture may be determined by summing a portion of the amplitude distribution corresponding to higher amplitudes and comparing the sum to a threshold.

The lengths may also indicate the presence of texture. For example, where texture is repetitive, the lengths may have a consistent value, and a distribution of the lengths may show a peak or a spike corresponding to a typical length for the texture. When no texture is present, the distribution of lengths may not have a speak or a spike because there is not a consistent pattern to the intersection lengths. This intersection analysis may be performed for an entire image to determine the overall texture in the image or may be performed on a portion of the image to determine the texture in that portion. In some embodiments, the presence of texture may be determined by detecting a peak or spike in a distribution of the lengths.

At step 208, an optional operation may be performed to downscale the input image (whether or not smoothing has been performed). For instance, if the input image is greater than a threshold resolution or size, the downscaling operation may be performed on the input image in order to reduce its size to reduce the amount of computations. As mentioned before, downscaling may be accomplished by utilizing linear smoothing, nearest-neighbor smoothing, bilinear smoothing, or bi-cubic smoothing, etc.

Figure 3:
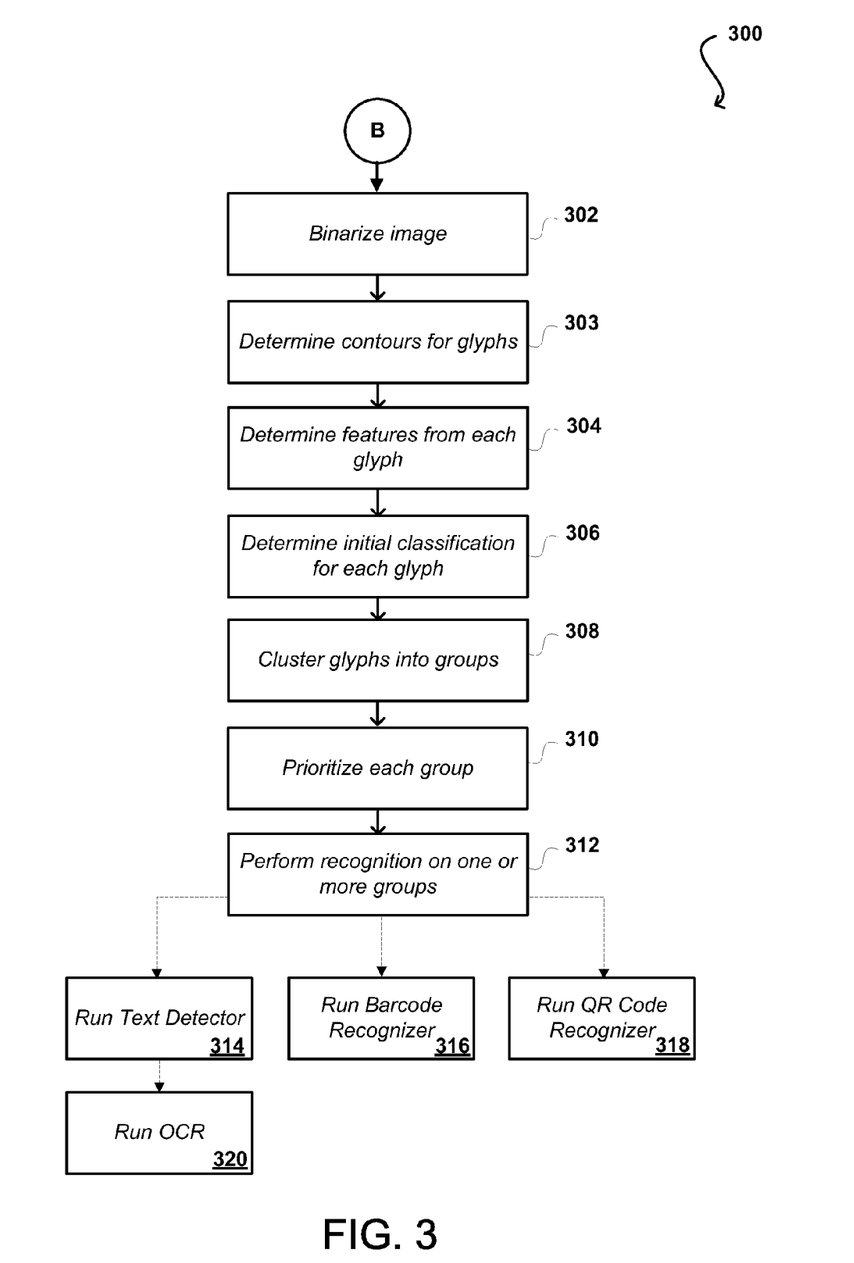
FIG. 3 illustrates steps of an example process for determining one or more classifications for a given image that can be used in accordance with some embodiments of the subject technology.

The smoothed and/or downscaled image is then further processed as described in FIG. 3 (as indicated by the arrow to "B").

FIG. 3 illustrates steps of an example process 300 for determining one or more classifications for a given image that can be used in accordance with some embodiments of the subject technology. In some embodiments, the process 300 may be implemented by one or more computing devices or systems. Additionally, the process 300 may be performed in conjunction with the process 200 described in FIG. 2. More specifically, FIG. 3 provides an example process that may be utilized as an image classifier to classify, in an efficient manner, segments of a given image into one or more types of categories of glyphs.

At step 302, a binarization of the received image is performed. As mentioned before, one or more techniques to binarize a given image may be used and still be within the scope of the subject technology. Such techniques may include, but are not limited to, image segmentation, MSER, MSCR or an intersection analysis as described herein. As previously discussed, binarization refers to a set of operations in which an image (or portion of the image) is processed to only have two possible values that respectively represent one of two colors for each pixel. For instance, two colors utilized for a binarized image may be black and white. In one example, foreground portions, such as pixels corresponding to text, barcode and/or QR code patterns may be one color, while the remaining portion of the image (e.g., background) is another color. In some embodiments, a binarization of the received image may be performed in which the image is converted into a black and white image. In one example, a threshold value is utilized and a pixel or set of pixels that have values above the threshold value are classified as white, and any other pixels below the threshold value are classified as black.

With respect to binarizing the received image using an intersection analysis, such an intersection may be performed between a smoothed image and an (original) input image of the received image. By reference to FIG. 2, the smoothed image may be received from step 208 (e.g., the smoothed and/or downscaled image), and the input image may be received at step 202 as described before. In one example, for each row of the respective images, the intersection analysis may initially determine a distribution of intersection lengths and a distribution of amplitudes of intersections. Next, for a given row, each of the amplitudes of intersections along the y axis, corresponding to a respective intersection length along the x axis, are compared to respective threshold values associated with a respective corresponding coordinate position along the x axis from a waveform representing the smoothed image for the given row.

More specifically, for each of the intersection lengths for the given row, a coordinate position corresponding to a crest or trough of a respective amplitude of intersection of the received processed image may determine the binarization value. A pixel or set of pixels corresponding to the intersection length along the x-axis is set to a value of 1 responsive to the respective amplitude of intersection surpassing the threshold coordinate position along the x axis from the waveform representing the smoothed image. Otherwise, the pixel or set of pixels corresponding to the intersection length along the x-axis is set to a value of 0 responsive to the respective amplitude of intersection being below the threshold coordinate position along the x axis from the waveform representing the smoothed image. Thus, the waveform corresponding to the smoothed image is utilized to determine respective threshold values for comparison in the manner described above. A binarized image is produced based on the aforementioned threshold values comparisons from the intersection analysis.

In some cases, text (or another pattern such as barcode or QR code) in a given image could be darker than a background of the image. In other cases, text in a given image could be brighter than a background of the image. To cover such cases, in some embodiments, two respective binarized images are produced based on the aforementioned intersection analysis or other techniques such as image segmentation, MSER, MSCR, etc., to provide 1) a white on black image, and 2) a black on white image. By way of example, the aforementioned intersection analysis could be performed on the image and the two colors chosen accordingly for pixels in the image to produce a white on black image. The subject technology could then reverse the colors for the white on black image to produce the black on white image. Contours may then be extracted for each of the respective white on black and black on white images and features subsequently determined based on the contours. In the case of a barcode or QR code being present in the image, only black on white processing may be necessary in some examples since a given barcode or QR code will include black patterns or shapes on a white background.

At step 303, contours are determined for glyphs in the image using the binarized image. As used herein, a contour represents an outline of an object, shape, or glyph included in the image. As noted above, a glyph can include any portion of an object to be recognized, including a letter, a part of a letter, a part of a bar code, and a part of a QR code. The contours may include external contours, internal contours (e.g., the inside contour of the letter "0"), or both. In some embodiments, external contours may be determined by detecting the outside edges of such an outline of the object or shape included in the image. Other ways to determine external contours may be utilized and still be within the scope of the subject technology.

At step 304, features may be determined for each of the glyphs identified at step 303. The features may be used, for example, to determine a type of the glyph (such as whether it corresponds to text, a bar code, or a QR code) and also for determining whether two glyphs are related (e.g., two letters of the same size and color may be more likely to be part of the same word). The features may be determined from the contours, the input image, the smoothed image, or the binarized image.

Features that may be determined from the contours include information about gradients (such as a histogram), a perimeter of the contour, a width or height of the glyph, an aspect ratio, Hu moments, a Haar transformation or a Hough transformation. Features that may be determined from the original image or the smoothed image include information (such as an average value or a histogram) about the color or brightness of the glyph in the region corresponding to the contour and a histogram of oriented gradients. Features extracted from the binarized image may include a stroke width. In some embodiments, the features for each glyph may be concatenated to create a feature vector.

At step 306, the features are used to perform an initial classification of the type of each glyph. In some examples, a score may be determined for each glyph that indicates a likelihood that the glyph corresponds to different types of glyphs. For example, a first score may indicate a likelihood that the glyph corresponds to a text, a second score may indicate a likelihood that the glyph corresponds to a bar code, and a third score may indicate a likelihood that the glyph corresponds to a QR code. Any relevant techniques may be used to classify the glyphs using the feature vectors. For example, machine learning may be used to create models for each type, and the models for each type may be used to create the corresponding score. In some embodiments, a state vector machine or a classification forest may be used. In some embodiments, a database of external contours of different letters (e.g., A, B, C, etc.) may be utilized to match local features of the external contours to respective letter glyphs. A glyph may have a high score for more than one type. For example, the letter "l" may have a high score for both text and a barcode. Some glyphs may receive low scores for all types and may be rejected and not processed further.

At step 308, glyphs are clustered into groups. For example a sequence of letters may be clustered into a single group or object. Any relevant features may be used to cluster the glyphs, including any of the features discussed above, and any relevant clustering techniques may be used. For example, features that may be used for clustering include the location and size of the glyphs, the color or brightness of the glyphs, and whether the glyphs are likely of the same type. In some embodiments, unsupervised clustering may be used. For example, the clustering may start with a first glyph, and a second glyph (e.g., the nearest glyph to the first glyph) may be analyzed to determine if it should be clustered with the first glyph. If the glyphs are clustered into a single group, a third glyph may then be analyzed to determine if it should also be part of the same group. After the glyphs have been clustered into groups, each group can be analyzed to determine the type of the group using any relevant techniques. For example, the most common type of the individual glyphs in the group may determine the overall type of the group. In some embodiments, the group can have a score for each type indicating a likelihood that the group corresponds to teach type.

At step 310, each of the groups is prioritized for further processing. Step 310 is optional and may not be performed in all embodiments. The priority of a group may be determined using a variety of criteria. One criteria may be the size and position of the group in the image. Larger and/or central groups may have higher priority than smaller or off-center groups. Another criteria may be the certainty of the classification of the group. If the group is clearly of a certain type the group may have higher priority and if the type is uncertain, it may have a lower priority (or vice versa). Another criteria may be statistical information about detected types of groups and most frequently detected types may have higher priority. For instance, if most of the time a barcode pattern is detected, then a barcode type may have higher priority. Information regarding a history of detected group types, in some embodiments, may be saved in a respective user profile. Additional criteria include available resources on a mobile computing device or on a server, which may then be used to prioritize one type of group depending on the available resources. In one example, where one type is relatively resource expensive and the available resources are not sufficient to optimally run detection on that type, that type of group may be given lower priority.

At step 312, one or more groups are processed to perform the appropriate type of recognition for that group. In some embodiments, the highest priority group is processed first, and a second group is processed only after the first group has completed processing. In some embodiments, multiple groups are processed simultaneously. The recognition may be performed on the mobile computing device or the information about the group may be sent to a server for processing on the server. For the processing of each group, either the entire image may be processed or a portion of the image corresponding only to that group may be processed.

At step 314, a text detector is run on at least the portion of the image corresponding to a group determined to have text. In some embodiments, text detection may be performed based on an Otsu thresholding algorithm. The Otsu thresholding algorithm assumes that the image to be thresholded includes two classes of pixels (e.g., foreground and background) and then calculates an optimal threshold separating the two classes so that their combined spread (intra-class variance) is minimal. The optimal threshold may then be utilized to binarize the image. Such an image may then be received by an OCR engine at step 320 to recognize the text included in the image or the portion of the image corresponding to the group.

It should be appreciated that other techniques may be utilized to detect text and still be within the scope of the subject technology. For instance, in some examples, detecting text in the image can include locating regions of extremes (e.g., regions of sharp transitions between pixel values) such as the edges of letters. The regions of extremes, or the maximally stable extremal regions (MSERs), can be extracted and analyzed to detect characters, where the detected characters can be connected and aggregated. An extremal region can be a set of connected pixels which have grayscale values above some threshold, and where the size of the region does not change significantly when the threshold is varied over some range. In addition to being stable, the regions can contain most of the edge intensity found by computing a gradient image beforehand. Regions that either have too many or too few pixels, and any MSER whose aspect ratio is too different from normal text or which has more than threshold amount of child regions, can be ignored. A set of regions that remain that have not been rejected may then be sent to an OCR engine at step 320 to recognize the text therein.

Alternatively or simultaneously, at step 316, a barcode recognizer is run on at least a portion of the image corresponding to a group of glyphs determined to have a barcode. In some embodiments, since a barcode includes a set of approximately equal long, parallel lines in a small area, the barcode recognizer may sample a single row across the group. From this sampled row, a respective width of each column of a given barcode portion may then be determined. It is appreciated that other techniques may be utilized for barcode recognition and still be within the scope of the subject technology.

Alternatively or conjunctively, at step 318, a QR code recognizer is run on at least a portion of the image corresponding to a group determined to have a QR code. A given QR code, in some examples, includes a pattern of three squares in the top left, top right and bottom left corner of the QR code (e.g., a finder pattern). Assuming this is the case, in some embodiments, QR code recognition may be performed by detection of such a pattern within the received image. Other techniques include using a Canny edge detector and recognizing square contours or shapes. It is appreciated that other techniques may be utilized for QR code recognition and still be within the scope of the subject technology.

Figure 5A:
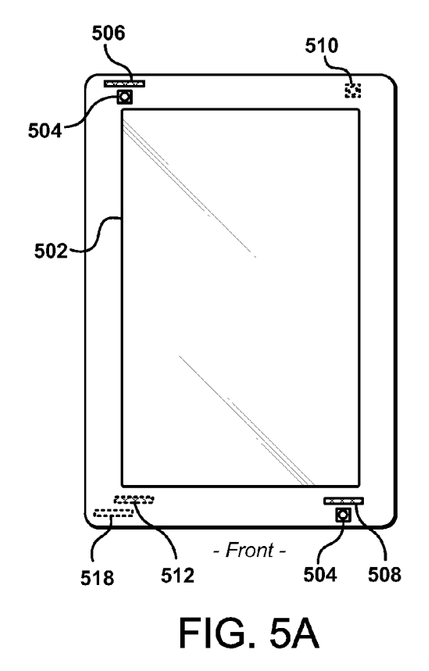
FIGS. 5A and 5B illustrate front and back views, respectively, of an example electronic computing device that can be used in accordance with various embodiments.
Figure 5B:
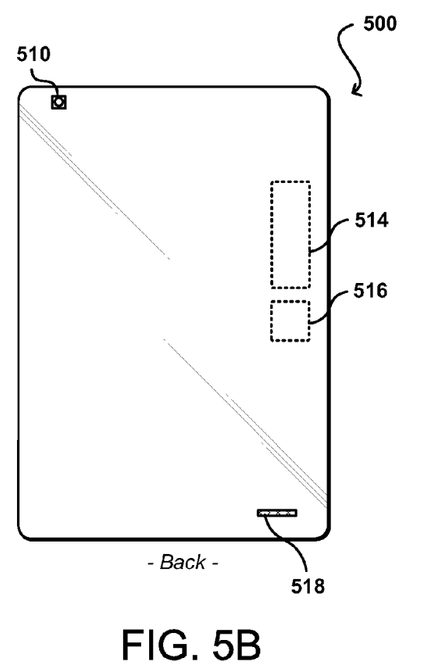

FIGS. 5A and 5B illustrate front and back views, respectively, of an example electronic computing device 500 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 500 has a display screen 502 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 504 on the front of the device and at least one image capture element 510 on the back of the device. It should be understood, however, that image capture elements could also, or alternatively, be placed on the sides or corners of the device, and that there can be any appropriate number of capture elements of similar or different types. Each image capture element 504 and 510 may be, for example, a camera, a charge-coupled device (CCD), a motion detection sensor or an infrared sensor, or other image capturing technology.

As discussed, the device can use the images (e.g., still or video) captured from the imaging elements 504 and 510 to generate a three-dimensional simulation of the surrounding environment (e.g., a virtual reality of the surrounding environment for display on the display element of the device). Further, the device can utilize outputs from at least one of the image capture elements 504 and 510 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 508 on the front side, one microphone 512 on the back, and one microphone 506 on or near a top or side of the device. In some devices there may be only one microphone, while in other devices there might be at least one microphone on each side and/or corner of the device, or in other appropriate locations.

The device 500 in this example also includes one or more orientation- or position-determining elements 518 operable to provide information such as a position, direction, motion, or orientation of the device. These elements can include, for example, accelerometers, inertial sensors, electronic gyroscopes, and electronic compasses.

The example device also includes at least one computing mechanism 514, such as may include at least one wired or wireless component operable to communicate with one or more electronic devices. The device also includes a power system 516, such as may include a battery operable to be recharged through conventional plug-in approaches, or through other approaches such as capacitive charging through proximity with a power mat or other such device. Various other elements and/or combinations are possible as well within the scope of various embodiments.

Figure 6:
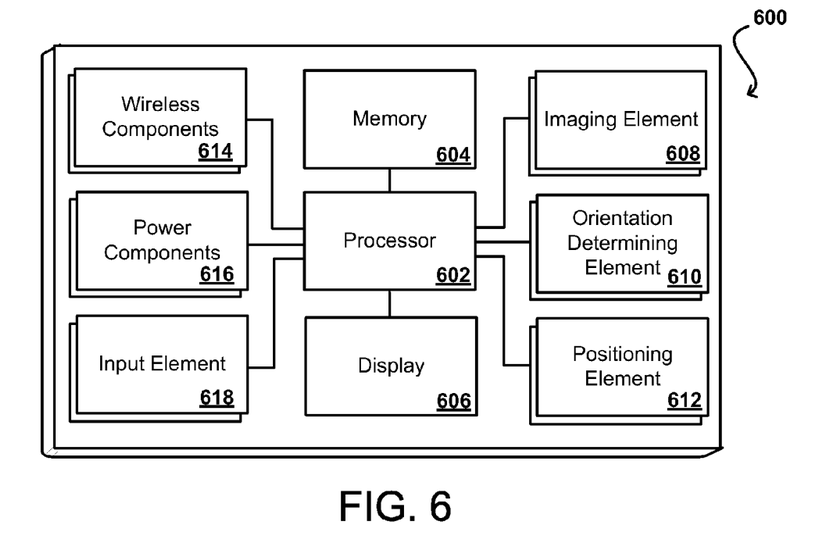
FIG. 6 illustrates a set of basic components of an electronic computing device such as the device described with respect to FIGS. 5A and 5B.

FIG. 6 illustrates a set of basic components of an electronic computing device 600 such as the device 500 described with respect to FIGS. 5A and 5B. In this example, the device includes at least one processing unit 602 for executing instructions that can be stored in a memory device or element 604. As would be apparent to one of ordinary skill in the art, the device can include many types of memory, data storage, or computer-readable media, such as a first data storage for program instructions for execution by the processing unit(s) 602, the same or separate storage can be used for images or data, a removable memory can be available for sharing information with other devices, and any number of computing approaches can be available for sharing with other devices.

The device typically will include some type of display element 606, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 608, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 600 also includes at least one orientation determining element 610 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 600. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 612 for determining a location of the device (or the user of the device). A positioning element can include or comprise a GPS or similar location-determining elements operable to determine relative coordinates for a position of the device. As mentioned above, positioning elements may include wireless access points, base stations, etc. that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 614 operable to communicate with one or more electronic devices within a computing range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 616, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 618 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

Figure 7:
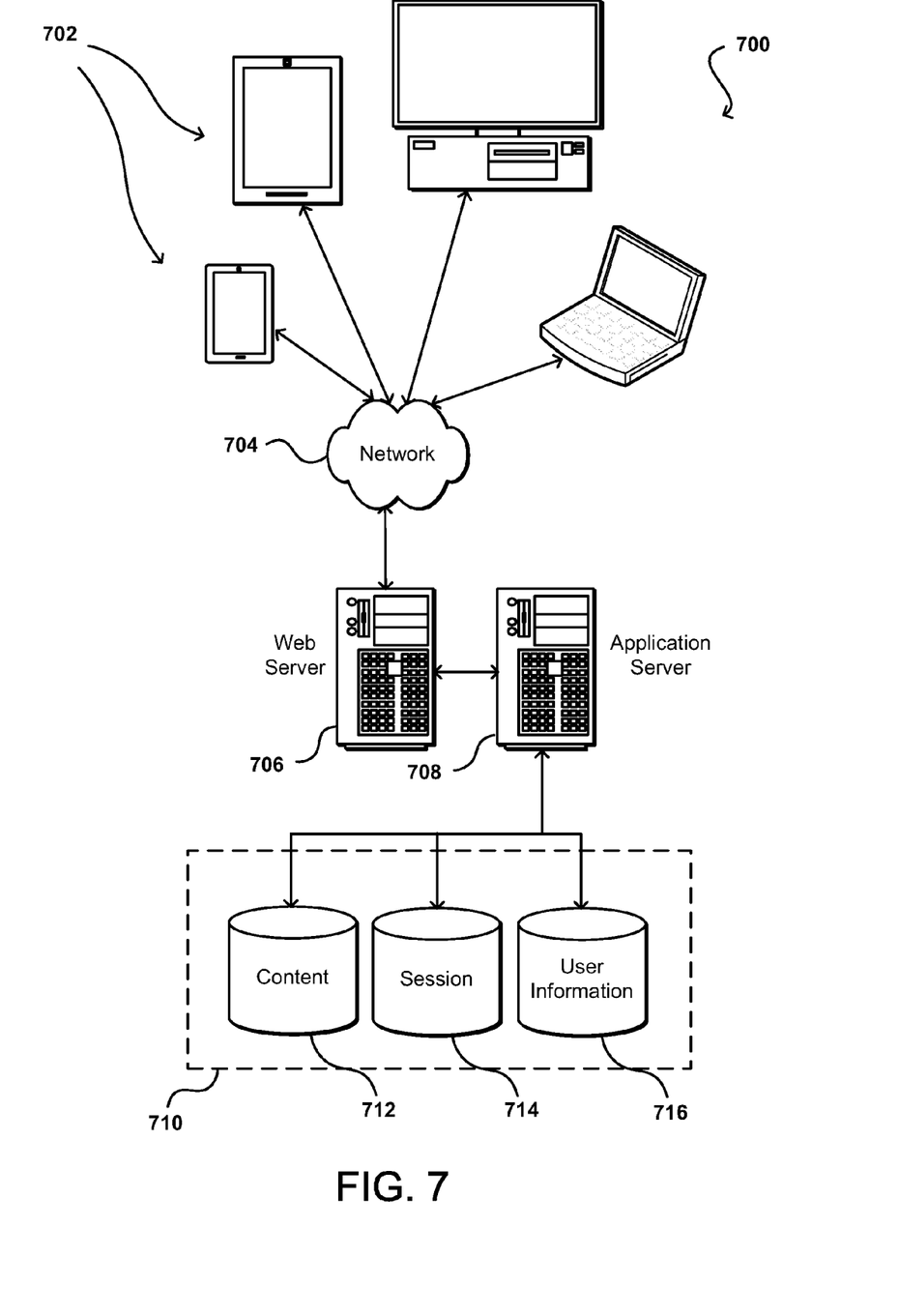
FIG. 7 illustrates an example of an environment for implementing aspects in accordance with various embodiments of the subject technology.

As discussed, different approaches can be implemented in various environments in accordance with the described embodiments. For example, FIG. 7 illustrates an example of an environment 700 for implementing aspects in accordance with various embodiments. As will be appreciated, although a Web-based environment is used for purposes of explanation, different environments may be used, as appropriate, to implement various embodiments. The system includes an electronic client device 702, which can include any appropriate device operable to send and receive requests, messages or information over an appropriate network 704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Computing over the network can be enabled via wired or wireless connections and combinations thereof. In this example, the network includes the Internet, as the environment includes a Web server 706 for receiving requests and serving content in response thereto, although for other networks, an alternative device serving a similar purpose could be used, as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 708 can include any appropriate hardware and software for integrating with the data store 710 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 706 in the form of HTML, XML or another appropriate structured language in this example. The handling of all requests and responses, as well as the delivery of content between the client device 702 and the application server 708, can be handled by the Web server 706. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing content (e.g., production data) 712 and user information 716, which can be used to serve content for the production side. The data store is also shown to include a mechanism for storing log or session data 714. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via computing links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN"). Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate storage media used in the art, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method comprising:
    acquiring an input image via a camera of a mobile computing device;
    determining an amount of texture in the input image;
    performing a smoothing operation on the input image to produce a smoothed image;
    creating a binarized image from the smoothed image;
    identifying a plurality of contours using the binarized image, wherein each contour of the plurality of contours corresponds to a glyph of a plurality of glyphs;
    computing a plurality of features for a first glyph of the plurality of glyphs, wherein the features are computed using at least one of the input image, the smoothed image, or the binarized image;
    computing a plurality of scores for the first glyph using at least a portion of the plurality of features, wherein each score of the plurality of scores corresponds to a type of glyph;
    creating a group of glyphs comprising the first glyph using the plurality of scores for the first glyph;
    determining a type for the group of glyphs, wherein the type comprises text, barcode, or QR code; and
    causing a recognition operation to be performed using at least a portion of the input image, at least a portion of the smoothed image, or at least a portion of the binarized image, wherein the recognition operation corresponds to the type of the group.

2. The computer-implemented method of claim 1, wherein performing the smoothing operation comprises:
    performing a downscaling operation on the input image to produce a downscaled image; and
    performing an upscaling operation on the downscaled image to produce an upscaled image.

3. The computer-implemented method of claim 1, wherein determining an amount of texture in the input image comprises:
    determining a plurality of intersections between a row of the image and a smoothed version of the row of the image;
    determining a plurality of amplitudes corresponding to differences between the row of the image and the smoothed version of the row of the image;
    using the plurality of amplitudes to determine an amount of texture in the image.

4. The computer-implemented method of claim 1, wherein a first contour corresponds to the first glyph and wherein the plurality of features comprises one or more of a gradient of the first contour, a perimeter of the first contour, a size of the first glyph, a color of a portion of the input image corresponding to the first glyph, or a stroke width.

5. A system comprising:
    a processor; and
    a memory device including instructions that, when executed by the processor, cause the processor to:
    receive an image;
    create a binarized image from the image;
    identify a plurality of contours using the binarized image, wherein each contour of the plurality of contours corresponds to a glyph of a plurality of glyphs;
    compute a plurality of features for a first glyph of the plurality of glyphs;
    compute a plurality of scores for the first glyph using at least a portion of the plurality of features, wherein each score of the plurality of scores corresponds to a type of glyph;
    create a group of glyphs comprising the first glyph using the plurality of scores for the first glyph;
    determine a type for the group of glyphs;
    cause a recognition operation to be performed for the group, wherein the recognition operation corresponds to the type of the group.

6. The system of claim 5, wherein the instructions further cause the processor to:

determine whether texture is present in the image; and
smooth the image to reduce the texture.

7. The system of claim 6, wherein the instructions further cause the processor to determine whether texture is present in the image by:
   determining a plurality of intersections between a row of the image and a smoothed version of the row of the image;
   determining a plurality of amplitudes corresponding to differences between the row of the image and the smoothed version of the row of the image;
   using the plurality of amplitudes to determine whether texture is present in the image.

8. The system of claim 7, wherein using the plurality of amplitudes to determine whether texture is present in the image comprises:
   creating a distribution of the plurality of amplitudes; and
   comparing a sum of at least a portion of the distribution to a threshold.

9. The system of claim 8, wherein the instructions further cause the processor to:
   create a second group of glyphs;
   determine a second type for the second group of glyphs;
   determine a first priority for the first group and a second priority for the second group, wherein the first priority is higher than the second priority; and
   cause a second recognition operation to be performed, wherein the second recognition operation corresponds to the second type, and wherein the second recognition operation begins after the recognition operation begins.

10. The system of claim 5, wherein a first contour corresponds to the first glyph and wherein the plurality of features comprises one or more of a gradient of the first contour, a perimeter of the first contour, a size of the first glyph, a color of a portion of the input image corresponding to the first glyph, or a stroke width.

11. The system of claim 5, wherein the instructions further cause the processor to:
   compute a plurality of scores for the first glyph by using a model for each type of glyph and using a state vector machine or a classification forest.

12. The system of claim 5, wherein the instructions further cause the processor to:
   create a group of glyphs by using an unsupervised clustering procedure.

13. A non-transitory computer-readable medium including instructions stored therein that, when executed by at least one computing device, cause the at least one computing device to:
   receive an image;
   create a binarized image from the image;
   identify a plurality of contours using the binarized image, wherein each contour of the plurality of contours corresponds to a glyph of a plurality of glyphs;
   compute a plurality of features for a first glyph of the plurality of glyphs;
   compute a plurality of scores for the first glyph using at least a portion of the plurality of features, wherein each score of the plurality of scores corresponds to a type of glyph;
   create a group of glyphs comprising the first glyph using the plurality of scores for the first glyph;
   determine a type for the group of glyphs; and
   cause a recognition operation to be performed for the group, wherein the recognition operation corresponds to the type of the group.

14. The non-transitory computer-readable medium of claim 13, wherein the instructions further cause the at least one computing device to:
   determine whether texture is present in the image; and
   smooth the image to reduce the texture.

15. The non-transitory computer-readable medium of claim 14, wherein the instructions further cause the at least one computing device to determine whether texture is present in the image by:
   determining a plurality of intersections between a row of the image and a smoothed version of the row of the image;
   determining a plurality of amplitudes corresponding to differences between the row of the image and the smoothed version of the row of the image;
   using the plurality of amplitudes to determine whether texture is present in the image.

16. The non-transitory computer-readable medium of claim 15, wherein using the plurality of amplitudes to determine whether texture is present in the image comprises:
   creating a distribution of the plurality of amplitudes; and
   comparing a sum of at least a portion of the distribution to a threshold.

17. The non-transitory computer-readable medium of claim 16, wherein the instructions further cause the at least one computing device to:
   create a second group of glyphs;
   determine a second type for the second group of glyphs;
   determine a first priority for the first group and a second priority for the second group, wherein the first priority is higher than the second priority; and
   cause a second recognition operation to be performed, wherein the second recognition operation corresponds to the second type, and wherein the second recognition operation begins after the recognition operation begins.

18. The non-transitory computer-readable medium of claim 13, wherein a first contour corresponds to the first glyph and wherein the plurality of features comprises one or more of a gradient of the first contour, a perimeter of the first contour, a size of the first glyph, a color of a portion of the input image corresponding to the first glyph, or a stroke width.

19. The non-transitory computer-readable medium of claim 13, wherein the instructions further cause the at least one computing device to:
   compute a plurality of scores for the first glyph by using a model for each type of glyph and using a state vector machine or a classification forest.

20. The non-transitory computer-readable medium of claim 13, wherein the instructions further cause the at least one computing device to:
   create a group of glyphs by using an unsupervised clustering procedure.

* * * * *